(12) United States Patent
Pershin et al.

(10) Patent No.: US 9,442,792 B2
(45) Date of Patent: Sep. 13, 2016

(54) USING STRETCHED STORAGE TO OPTIMIZE DISASTER RECOVERY

(71) Applicant: VMware, Inc., Palo Alto, CA (US)

(72) Inventors: Aleksey Pershin, Fremont, CA (US); Ilia Langouev, Santa Cruz, CA (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 14/312,561

(22) Filed: Jun. 23, 2014

(65) Prior Publication Data

US 2015/0370660 A1    Dec. 24, 2015

(51) Int. Cl.
G06F 11/07    (2006.01)

(52) U.S. Cl.
CPC ......... G06F 11/079 (2013.01); G06F 11/0721 (2013.01); G06F 11/0751 (2013.01); G06F 11/0772 (2013.01)

(58) Field of Classification Search
CPC ........... G06F 11/2033; G06F 11/2023; G06F 11/2056; G06F 11/2094; G06F 11/1464; G06F 11/2069
See application file for complete search history.

(56) References Cited

U.S. PATENT DOCUMENTS

| | | | |
|---|---|---|---|
| 8,495,418 B2 | 7/2013 | Abraham et al. | |
| 8,539,488 B1 | 9/2013 | Havemose | |
| 8,874,954 B1 | 10/2014 | Gupte et al. | |
| 8,972,656 B1 | 3/2015 | Armangau et al. | |
| 8,972,657 B1 | 3/2015 | Armangau et al. | |
| 9,141,625 B1 | 9/2015 | Thornewell et al. | |
| 2003/0074596 A1 | 4/2003 | Mashayekhi et al. | |
| 2006/0047776 A1 | 3/2006 | Chieng et al. | |
| 2008/0115008 A1 | 5/2008 | Daftardar | |
| 2008/0189468 A1* | 8/2008 | Schmidt | G06F 11/203 711/6 |
| 2010/0064168 A1* | 3/2010 | Smoot | G06F 11/2069 714/6.12 |
| 2010/0332889 A1 | 12/2010 | Shneorson et al. | |
| 2011/0026478 A1 | 2/2011 | Lee et al. | |
| 2011/0264788 A1 | 10/2011 | Costa | |
| 2012/0084445 A1 | 4/2012 | Brock et al. | |
| 2012/0159101 A1 | 6/2012 | Miyoshi | |
| 2013/0024922 A1 | 1/2013 | Rodriguez | |
| 2013/0031544 A1 | 1/2013 | Sridharan et al. | |
| 2013/0036322 A1 | 2/2013 | Bauer et al. | |
| 2014/0047263 A1* | 2/2014 | Coatney | G06F 11/2023 714/4.11 |
| 2014/0068703 A1 | 3/2014 | Balus et al. | |
| 2014/0181572 A1* | 6/2014 | Bradfield | G06F 11/20 714/4.11 |
| 2014/0278623 A1 | 9/2014 | Martinez et al. | |
| 2014/0280961 A1 | 9/2014 | Martinez et al. | |
| 2014/0281348 A1* | 9/2014 | Nayar | G06F 12/02 711/173 |

(Continued)

OTHER PUBLICATIONS

Stretched Clusters and VMware vCenter Site Recovery Manager, Understanding the Options and Goals, Technical White Paper, VMware, Inc., 2009, 18 pages.

(Continued)

Primary Examiner — Charles Ehne

(57) ABSTRACT

Exemplary methods, apparatuses, and systems include determining that at least a portion of a protected site has become unavailable. A first logical storage device within underlying storage of a recovery site is determined to be a stretched storage device stretched across the protected and recovery sites. A failover workflow is initiated in response to the unavailability of the protected site, wherein the failover workflow includes transmitting an instruction to the underlying storage to isolate the first logical storage device from a corresponding logical storage device within the protected site.

20 Claims, 5 Drawing Sheets

(56) References Cited

U.S. PATENT DOCUMENTS

| | | | |
|---|---|---|---|
| 2015/0052282 A1 | 2/2015 | Dong | |
| 2015/0095443 A1 | 4/2015 | Yang et al. | |
| 2015/0095692 A1 | 4/2015 | Thiele et al. | |
| 2015/0193250 A1 | 7/2015 | Ito et al. | |
| 2015/0212913 A1 | 7/2015 | Anumalasetty et al. | |
| 2015/0234617 A1 | 8/2015 | Li et al. | |
| 2015/0237132 A1* | 8/2015 | Antony | H04L 67/1095 709/224 |
| 2015/0309890 A1 | 10/2015 | Pershin et al. | |
| 2015/0309901 A1 | 10/2015 | Pershin et al. | |
| 2015/0317194 A1 | 11/2015 | Sampath et al. | |
| 2015/0355982 A1* | 12/2015 | Ganesan | G06F 11/2023 714/4.11 |
| 2015/0370659 A1* | 12/2015 | Pershin | G06F 11/203 714/4.11 |
| 2015/0370660 A1 | 12/2015 | Pershin et al. | |
| 2016/0188232 A1 | 6/2016 | Ramachandran et al. | |

OTHER PUBLICATIONS

Non-Final Office Action for U.S. Appl. No. 14/312,546, mailed Feb. 24, 2016, 19 pages.

Notice of Allowance for U.S. Appl. No. 14/312,546, mailed Jul. 20, 2016, 15 pages.

* cited by examiner

USING STRETCHED STORAGE TO OPTIMIZE DISASTER RECOVERY

FIELD OF THE INVENTION

The various embodiments described herein relate to managing storage arrays in two different datacenter sites. In particular, embodiments relate to optimizing disaster recovery using one or more stretched storage devices.

BACKGROUND OF THE INVENTION

A primary consideration for the architecture of a virtual datacenter is how to best maximize the availability of the services provided by the virtual machines. Availability solutions are designed to improve the resiliency of local systems or entire sites and fall broadly into the categories of downtime avoidance and fault recovery. Fault recovery solutions include high availability and disaster recovery.

High availability (HA) is an automated failover solution, typically within a single datacenter, that responds to unplanned outages and restarts virtual machines as appropriate. For example, if the host computer running a virtual machine fails, HA may respond by restarting the virtual machine on another host computer.

Disaster recovery is a process for recovering all or a portion of a datacenter at a recovery site from replicated data. For example, a logical storage device within a protected datacenter site may be configured for active-passive replication to a recovery datacenter site. The protected logical storage device is active, e.g., configured to be available for read and write commands. The recovery logical storage device is passive, e.g., configured not to be available for read and write commands, to prevent corruption of the backup data. A disaster recovery tool may initiate recovery of all or a portion of the replicated data within the protected datacenter by making the recovery logical storage device active and then registering all the virtual machines stored in it at the recovery datacenter.

A new class of storage system products called "stretched storage" has emerged in the storage industry. These systems expose storage that can be stretched across two datacenters, enabling zero downtime failover of virtual machines across sites. For example, a stretched storage device is presented both to the protected site and to the recovery site as, effectively, the same device, enabling live migration across sites. Stretched storage devices add benefits to site-level availability and downtime avoidance, but introduce considerable complexity at the network and storage layers, as well as demanding rigorous operational management and change control. For example, stretched storage is configured to be active on both the protected site and the recovery site for read/write operations. Storage device writes are usually committed synchronously at both locations to ensure that data is consistent. If the stretched logical storage devices at both sites were to remain active despite a loss of communication between them, however, each would treat the replicated data as active and would allow conflicting modifications to the data. Such a scenario is referred to as a "split-brain" scenario. To avoid the split-brain scenario, a site preference is configured for each stretched logical storage device to elect a datacenter in which the stretched logical storage device is to be active in the event of a loss of the connectivity to the other datacenter. Consequently, the stretched logical storage device in the other datacenter is configured to become passive.

BRIEF DESCRIPTION OF THE DRAWINGS

The present invention is illustrated by way of an example and not limited to the figures and the accompanying drawings, in which like references indicate similar elements, and in which.

DETAILED DESCRIPTION

Embodiments described herein utilize stretched storage devices to optimize disaster recovery. As a result, the disaster recovery workflow is able to utilize live migration of virtual machines between two different datacenter sites to execute a planned failover without interrupting services provided by those virtual machines. Additionally, embodiments described herein maintain site preference in view of disaster recovery, enable virtual machines to be failed over without live migration, and/or prioritize live migration within the failover workflow.

Figure 1:
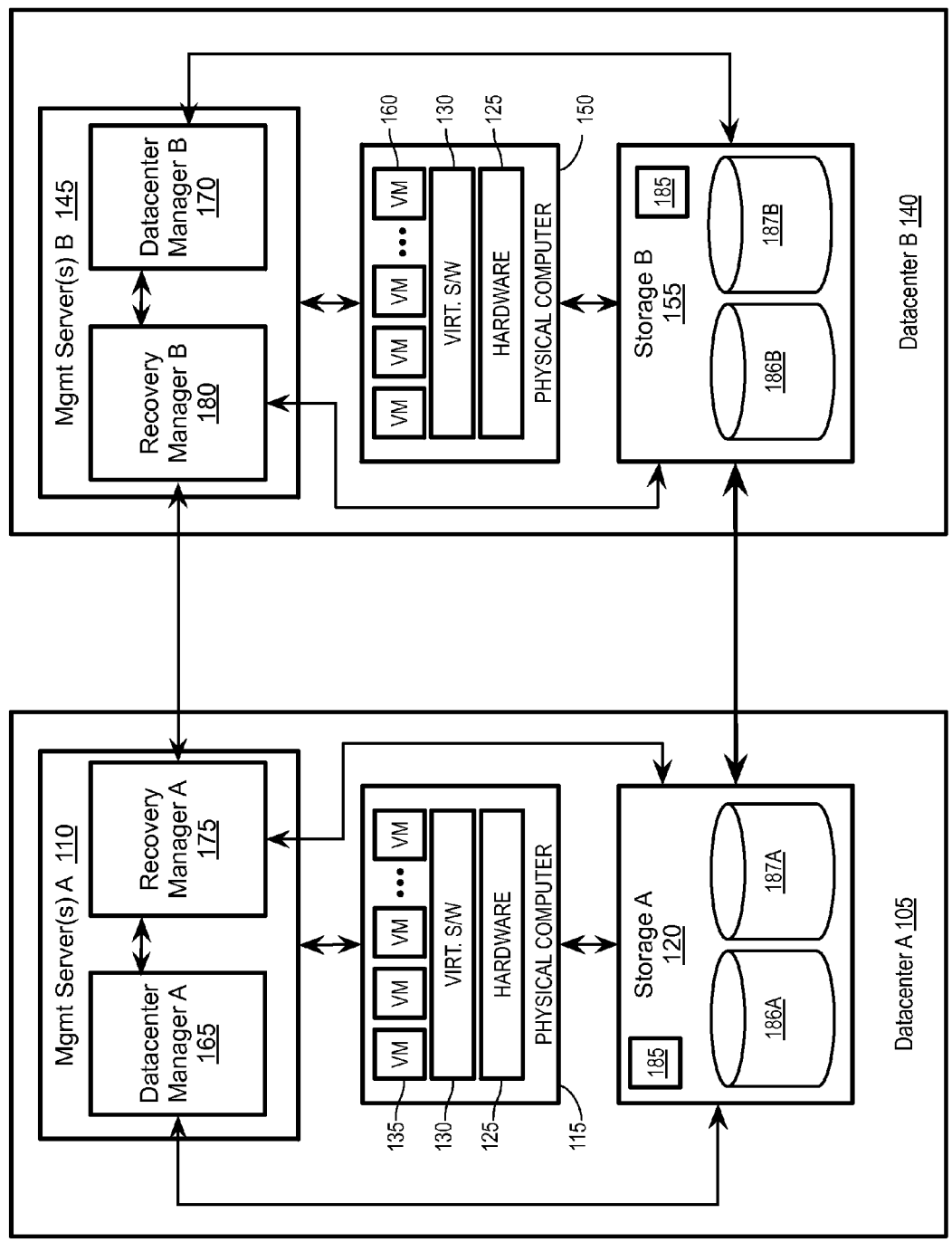
FIG. 1 illustrates, in block diagram form, exemplary virtual datacenters configured to optimize disaster recovery using one or more stretched storage devices.

FIG. 1 illustrates, in block diagram form, exemplary virtual datacenters configured to optimize disaster recovery using one or more stretched storage devices. Datacenter A 105 includes management server A 110, one or more host devices 115, and storage A 120. Each host device 115 includes hardware 125, virtualization software layer 130 (also referred to as a hypervisor), and virtual machines (VMs) 135. Similarly, datacenter B 140 includes management server B 145, one or more host devices 150, and storage B 155. Each host device 150 includes hardware 125, virtualization software layer 130, and VMs 160. In one embodiment, datacenter A 105 represents a first datacenter site and datacenter B represents a second, geographically distinct datacenter site.

VMs 135/160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, or security service (e.g., a firewall, webserver, database server, etc.).

Virtualization software layer 130 runs on hardware 125 of host device (e.g., a physical computer) 115/150 and manages one or more VMs. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM within underlying storage 120/155.

Each of storage A 120 and storage B 155 includes one or more physical storage devices. In one embodiment, storage A 120 and storage B 155 are storage arrays and include storage controllers 185 to serve read and write requests and management commands/queries from host devices 115/150 and management servers 110/145. Each of storage A 120 and storage B 155 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage A 120 is illustrated as including logical storage devices 186A and 187A and storage B 155 is illustrated as including logical storage devices 186B and 187B. Each of storage A 120 and storage B 155 may include additional arrays, logical storage devices, or other partitions of storage.

One or more of the logical storage devices in each of storage A 120 and storage B 155 is a stretched storage device. For example, logical storage devices 186A and 186B may be implemented as a single stretched storage device that is stretched across datacenter A 105 and datacenter B 140 with the logical storage devices 186A and 186B being copies of the same data within the respective datacenter. A network administrator may configure logical storage devices 186A and 186B for active-active replication such that writes are committed synchronously at both locations to ensure that the two copies of the data are consistent. In an active-active configuration, both copies of the data are available for read and write commands from VMs 135/160 in the respective datacenter or in both datacenters. As described further herein, the network administrator may further designate a protected site, a recovery site, site preference, as well as recovery preferences for the stretched storage devices 186A and 186B. In one embodiment, stretched storage devices 186A and 186B have a dynamic site preference that is controlled by a witness or quorum selection mechanism. The witness or quorum selection mechanism enables the dynamic determination of which site is to be active in the event of a failure (instead of the administrator picking a static site preference for each stretched device). For example, a witness could be implemented as software running in a third failure domain (meaning that it does not fail with one of datacenter A 105 and datacenter B 140). The witness could observe the arrays at both datacenter A 105 and datacenter B 140 and, if one of them fails, the witness could tell the array at the other site to assume that the opposite site is no longer available.

Additionally, a network administrator may configure a portion of storage A 120 for active-passive replication of, e.g., logical storage device 187A, to an array or a subdivision of storage B 155, e.g., logical storage device 187B. As used herein, active-passive replication provides a redundant copy of a logical storage device within the recovery datacenter, which is only brought online when the associated primary storage device within the protected datacenter fails. For example, the active instance, storage device 187A, is available for read and write commands from VMs 135 in host device(s) 115. The passive instance, storage device 187B, is a copy of storage device 187A and not available for read and write commands from any VMs 135/160 or hosts device(s) 115/150 in order to prevent corruption of the replicated data.

Management server A 110 includes datacenter manager A 165. In one embodiment, datacenter manager A 165 provides a management console for manual and automated control of hosts 115, VMs 135, and storage A 120. Similarly, datacenter manager B 170 provides a management console for manual and automated control of hosts 150, VMs 160, and storage B 155. For example, datacenter manager A 165 and datacenter manager B 170 provision, configure, and maintain VMs as virtual desktops or network services; manage pools of computer resources to run the VMs.

Management servers 110/145 further include recovery managers 175/180. The recovery managers 175/180 provide administrative access to define protection groups, recovery plans, a preferred recovery type, and other failover policies. In one embodiment, datacenter managers 165/170 are implemented within different management servers 110/145 than recovery managers 175/180. Recovery managers 175/180 provide the implementation for unplanned failover, planned failover, and other data availability/recovery workflows. In one embodiment, recovery managers 175/180 each monitor their respective host devices 115/150 for indications of an error with or failure of a storage device. In one embodiment, one or more recovery managers 175/180 are implemented by a corresponding datacenter manager 165/170.

Components of datacenter A 105 are coupled to components of datacenter B 140. While various components are illustrated as being directly coupled for the ease of explanation (e.g., to illustrate the direction of replicated data), a network including one or more switches or routers may lie between datacenter A 105 and datacenter B 140 and facilitate the coupling of the various components.

Figure 2:
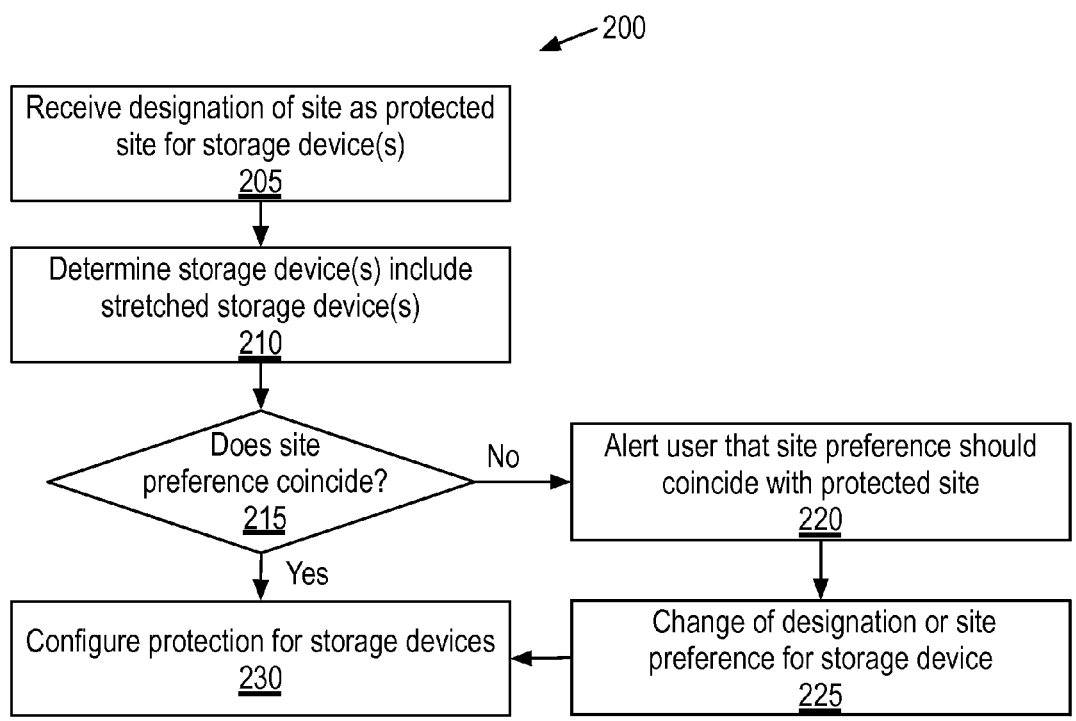
FIG. 2 is a flow chart illustrating an exemplary method of configuring stretched storage devices for a planned failover.

FIG. 2 is a flow chart illustrating exemplary method 200 of configuring stretched storage devices for a planned failover. At block 205, a recovery manager receives a designation of a datacenter site as the protected site for a set of one or more logical storage devices. For example, when logical storage devices are configured for active-passive replication (e.g., non-stretched storage devices), the active site is designated as protected and the passive site is designated as recovery. While stretched storage devices are configured for active-active replication, the site running the VM(s) that reside on the stretched storage device may be selected as the protected site while the other site is designated for recovery.

At block 210, the recovery manager determines that the set of logical storage devices includes one or more stretched storage devices. For example, the recovery manager may pass a device discovery command or another query to the underlying storage to identify stretched storage devices and their site preference settings. As used herein, "site preference" refers to the configuration for the set of logical storage devices to be active in the elected datacenter site in the event of loss of connectivity to the other datacenter. Consequently, the corresponding set of storage devices in the other datacenter is configured to become passive.

At block 215, the recovery manager determines if the site preference for each stretched storage device coincides with the protected site designations. For example, the recovery manager determines that the site preference is set to the protected site and not set for the recovery site for each protected stretched storage device.

If the site preference is not set to the protected site for a stretched storage device, at block 220, the recovery manager generates an error message or other warning to alert the network administrator that site preference should coincide with the protected site. In one embodiment, the recovery manager requires the network administrator to change either the protected site designation or the site preference and does not proceed with the recovery configuration until the protected site designation and the site preference coincide. Alternatively, the recovery manager automatically changes either the protected site designation or the site preference to cause the protected site designation and the site preference to coincide. In another embodiment, the recovery manager enables the network administrator to override the error message.

At block 225, the recovery manager changes or receives a notice of a change to either the protected site designation or the site preference such that the protected site designation and the site preference coincide (or receives a corresponding override command). As a result of having site preference coincide with the protected site, the recovery manager avoids a scenario in which the protected site renders the stretched storage device passive in response to a network partition between the protected and recovery sites (e.g., if the recovery site lost network connectivity and the protected site renders the stretched storage device passive to avoid the split brain scenario described above). If the protected site did not coincide with the site preference, the network partition may result in the corresponding stretched storage devices made passive by the storage array at the protected site, thus making virtual machines residing on the affected stretched storage devices at the protected site non-operational and the corresponding services provided by those virtual machines being interrupted until the network administrator is able to intervene.

When the site preference coincides with the protected site designation (or an override command has been received), at block 230, the recovery manager configures the underlying storage devices with the site preference to be ready for a planned or unplanned failover to be initiated when necessary.

In one embodiment, method 200 is performed when a stretched storage device is configured for disaster recovery protection. Additionally, method 200 may be performed periodically after configuration to make sure the protected site continues to have the site preference even after the protection is configured.

Figure 3:
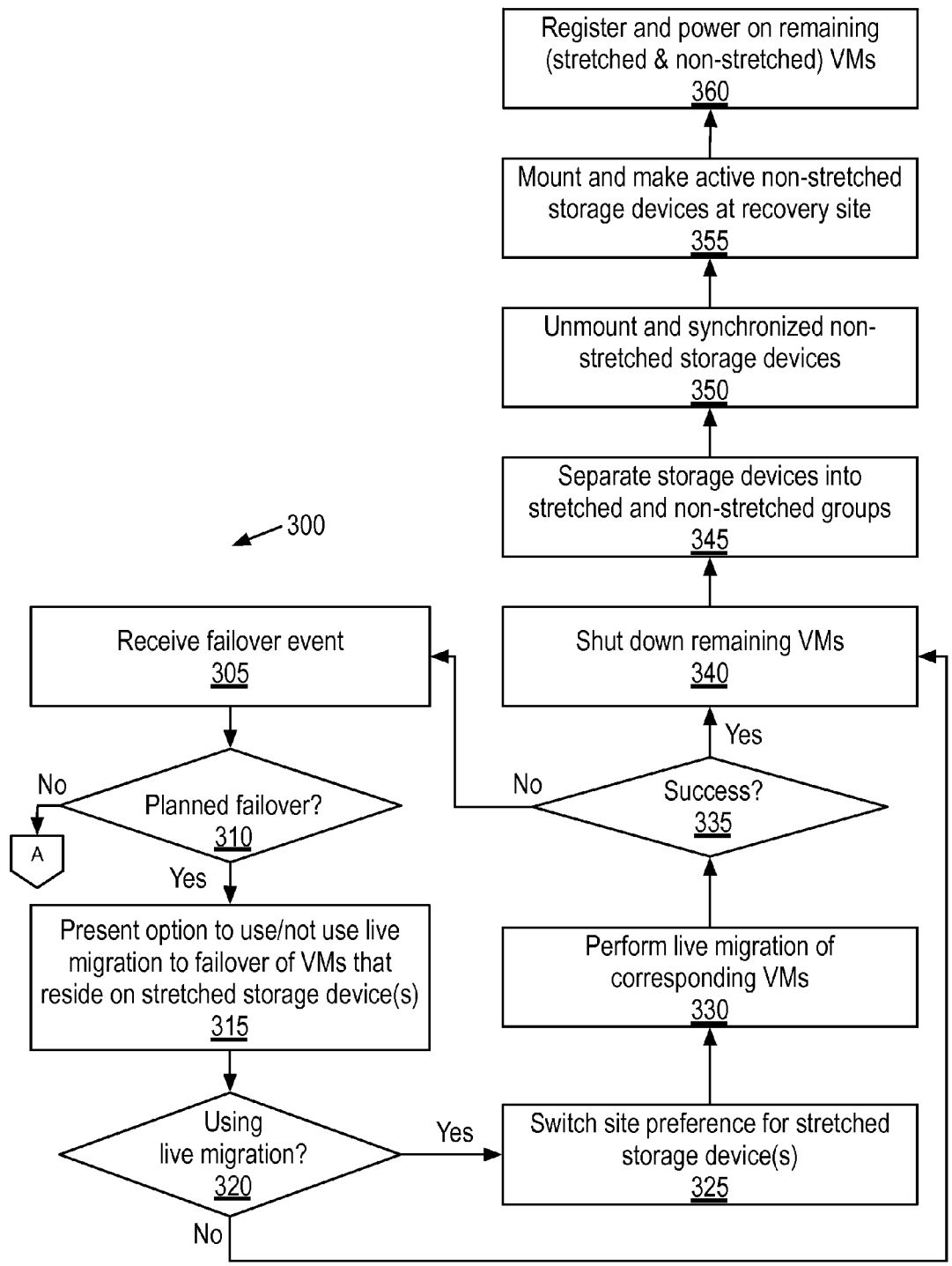
FIG. 3 is a flow chart illustrating an exemplary method of performing a planned failover using one or more stretched storage devices.

FIG. 3 is a flow chart illustrating exemplary method 300 of performing a planned failover using one or more stretched storage devices. At block 305, the recovery manager receives a failover event. A failover event may include a planned failover or an unplanned failover. A planned or unplanned failover may be initiated in response to a command from a network administrator. An unplanned failover may also be initiated in response to a loss of connectivity to the other site (e.g., due to a partial or complete protected site failure or due to a network partition).

At block 310, the recovery manager determines if the failover is planned or unplanned. For example, as described above, a planned failover may result from a user command and an unplanned failover may result from a loss of connectivity to the other site. If the failover is unplanned, method 300 continues via off-page connector A to FIG. 4 (described below).

If the failover is planned, at block 315, the recovery manager presents the network administrator with the option of using or not using live migration to fail over VMs that reside on the stretched storage. For example, given the time-sensitivity of the failover, the network administrator may utilize this option to balance service downtime against the more predictable timing of a traditional failover (e.g., shutting down VMs on the protected site, synchronizing their data, and restarting the VMs on the recovery site). Live migration may take a significant amount of time to complete and may fail for various reasons. For example, live migration includes copying the active memory of the VM from the protected site to the recovery site. Given a large memory, a significant number of changes to memory may occur during a transfer of the memory data. The live migration continues to replicate the changes to memory (i.e., the difference between the last transfer and current state of memory) to the recovery site until the changes are small enough that the VM can be stunned and migrated to the recovery site without causing a perceptible interruption to service. If a VM is too busy and generates too much data for the live migration synchronization of memory to converge, if the network latency to the recovery site is too long or too unstable, etc., the attempt at live migration may take longer than available or preferred to implement the failover workflow. As a result, the network administrator may accept service downtime and select the traditional failover when, e.g., an impending storm, flood, power outage, or other event is likely to disable the protected site within a short period of time.

In one embodiment, the option to select/deselect live migration or a traditional failover is a single option for all stretched storage devices. In another embodiment, the option to select/deselect live migration or a traditional failover is presented individually for each stretched storage device or groups of stretched storage devices. In another embodiment, the option to select/deselect live migration or a traditional failover is presented individually for each VM or groups of VMs. In one embodiment, these options are presented at an initial configuration of recovery settings and may be adjusted or confirmed at the time of the planned failover.

At block 320, the recovery manager determines if any VMs are to be failed over via live migration. If one or more VMs are to be failed over via live migration, at block 325, the recovery manager switches the site preference for the one or more stretched storage devices. For example, in anticipation of migrating or otherwise failing over VMs residing on the stretched storage within the protected site, the recovery manager switches the site preference for those VMs to the recovery site. If the protected site were to become unavailable during the migration of the VMs, the recovery site is able to avoid the former site preference rendering the stretched storage passive and rendering non-operational the corresponding VMs that were successfully migrated.

At block 330, the recovery manager initiates the live migration of the VMs. For example, the recovery of the VMs may be orchestrated in an order of priority set by the network administrator. High priority VMs may be migrated prior to low priority VMs.

Additionally, the VMs that are failed over via live migration are failed over prior to those that are failed over via a shut down, synchronization, and restart sequence. As described above, live migration has the potential to take a significant amount of time complete. By performing live migration first, the network administrator is able to implement the failover of one or more VMs without a service interruption that may result from a loss of the protected site during the failover. Furthermore, the network administrator is able to quickly detect and correct any issues that arise from live migration. In one embodiment, this correction may include the network administrator aborting the failover workflow and starting a new failover workflow with a change in the manner that one or more VMs are failed over (e.g., switching a VM from live migration to a traditional failover). Additionally, to facilitate live migration, the network between sites is configured such that a migrated VM can run at and is available to either site without any modifications to the VM. This may be referred to as "stretching the network." In other words, VMs eligible for live migration have their network configured as stretched. As a result, any computer systems that are dependent upon a VM residing on a stretched storage device that is failed over via live migration are able to continue operating. On the other hand, any computer systems dependent upon a VM residing on a non-stretched storage device will stop functioning when that VM is shut down (e.g., for a traditional failover). If live migration of a VM is performed first, downtime caused by these dependencies is minimized. For example, during live migration, dependent computer systems will remain operational because VMs residing on stretched storage would be accessible due to the stretched network and VMs residing on non-stretched storage would still be running at the protected site. Some downtime will begin when VMs residing on non-stretched storage are shut down at the protected site, but by that time a significant portion of the failover will have been performed by having migrated VMs residing on stretched storage over to the recovery site first.

At block 335, the recovery manager tracks the progress of each live migration and determines if the one or more VMs have been failed over successfully. For example, the recovery manager may determine that a live migration is unsuccessful in response to the live migration taking longer than a threshold period of time to complete, a loss of connectivity between sites occurring prior to the completion of the live migration, a command from the network administrator to abort the failover workflow prior to the completion of the live migration, etc. If live migration for any VM is determined to be unsuccessful, method 300 returns to block 305 to enable the network administrator to address any issues and initiate a new planned failover workflow or to switch to an unplanned recovery workflow.

If the live migration of each of the one or more VMs was completed successfully, or if live migration was not used during the current failover workflow, the recovery manager begins to fail over the remaining VMs via a traditional/an alternate failover methodology. At block 340, the recovery manager shuts down any remaining VMs (residing both on stretched and non-stretched storage devices) that were not subject to live migration.

At block 345, the recovery manager separates the storage devices to be failed over into two groups: stretched storage devices and non-stretched storage devices. For example, the recovery manager omits the operations of blocks 350 and 355 for stretched storage devices.

At block 350, the recovery manager unmounts the corresponding non-stretched storage devices and makes them passive at the protected site. Additionally, the recovery manager synchronizes any pending changes within the non-stretched storage devices from the protected site to the recovery site. At block 355, the recovery manager mounts and makes active the non-stretched storage devices at the recovery site.

At block 360, the recovery manager registers and powers on the remaining VMs (residing both on stretched and non-stretched storage devices).

Figure 4:
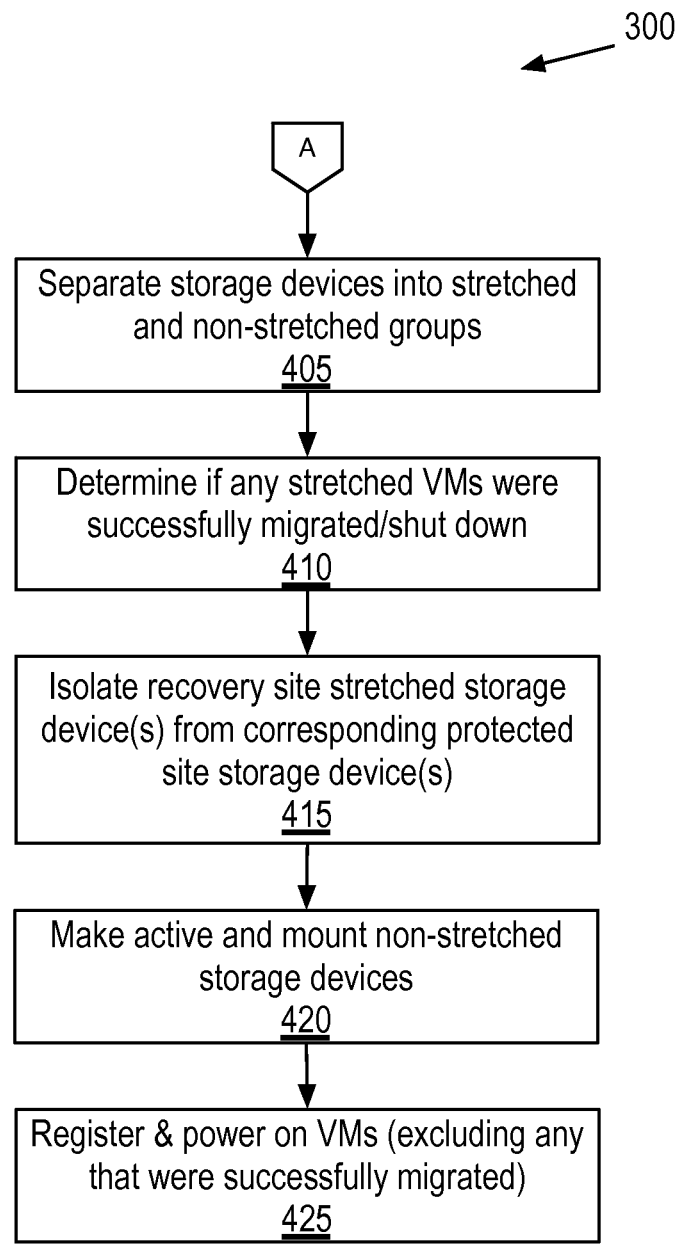
FIG. 4 is a flow chart illustrating an exemplary method of performing an unplanned failover after an unsuccessful or partial planned failover using one or more stretched storage devices.

FIG. 4 is a flow chart illustrating a continuation of method 300. In the event of an unplanned failover or an aborted or unsuccessful planned failover, at block 405, the recovery manager separates the storage devices to be failed over into two groups: stretched storage devices and non-stretched storage devices. For example, the recovery manager performs the operations of blocks 410-420 for only one of the two groups.

At block 410, the recovery manager determines if any VMs residing on the stretched storage devices were successfully shut down or migrated to the recovery site prior to initiating the unplanned failover workflow. For example, the unplanned failover workflow may be executed following an unsuccessful or otherwise incomplete planned failover workflow (as described above). In one embodiment, the recovery manager determines if a VM was successfully migrated by attempting to look up the VM at the recovery site using the same identifier (e.g., a universally unique identifier) as the corresponding VM at the protected site. If such a VM exists, the recovery manager checks if the VM was marked as successfully migrated by the live migration process. If such VM does not exist or if the VM is not marked as successfully migrated, the recovery manager considers this VM as not migrated to the recovery site.

At block 415, the recovery manager isolates the stretched storage devices from the protected site. For example, when a host computer within the protected site runs a VM residing on stretched storage, the host computer issues a heartbeat or one or more commands to keep the corresponding virtual machine files locked at the storage device level and to prevent a user from powering on the same VM on another host. If the protected site is only partially unavailable, the host continues to run the VM, and the network connection between the storage of each site is still functioning, the heartbeats locking the virtual machine files on the stretched storage will continue to propagate to the recovery site storage. To implement the failover, the recovery manager sends an instruction to the recovery site storage to prevent a stretched storage device from receiving a heartbeat signal and/or write commands from a corresponding stretched storage device within the protected site. As a result, the recovery manager is able to break the lock on the virtual machine files and restart the VM on a host computer within the recovery site.

In one embodiment, the recovery manager only isolates the stretched storage devices that include VMs that have yet to be migrated or shut down prior to the unplanned failover. For example, if all VMs residing on a stretched storage device within the protected site were either successfully shut down or migrated to the recovery site during the planned failover workflow (before the planned failover workflow failed or was interrupted), the recovery manager omits the corresponding stretched storage device within the recovery site from the isolation workflow.

At block 420, the recovery manager makes active and mounts the non-stretched storage devices at the recovery site. At block 425, the recovery manager registers and restarts the VMs (residing both on stretched and non-stretched storage devices, excluding those that were successfully migrated) on the recovery site.

Figure 5:
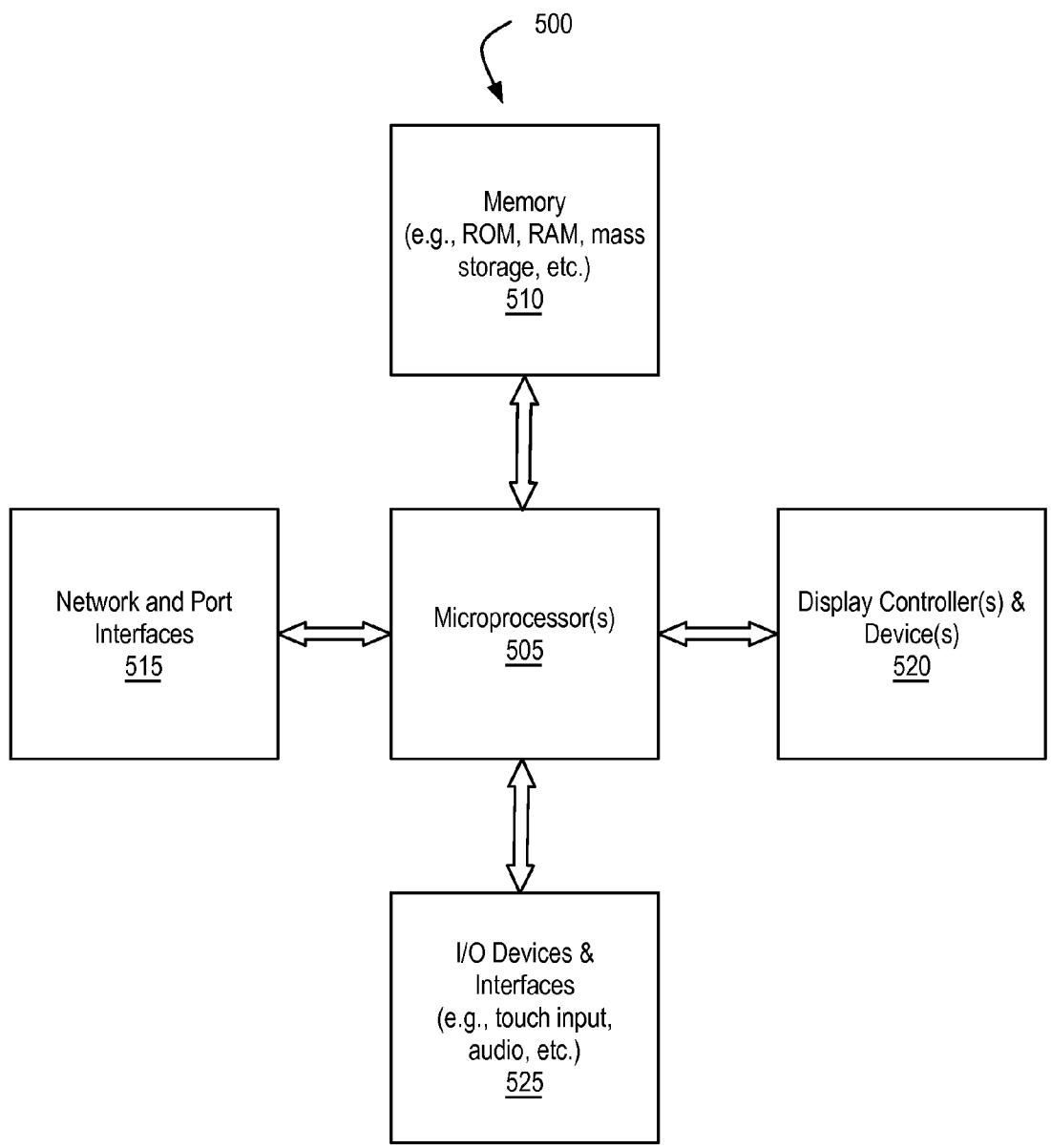
FIG. 5 illustrates, in block diagram form, an exemplary processing system to optimize disaster recovery using one or more stretched storage devices.

FIG. 5 illustrates, in block diagram form, an exemplary processing system to optimize disaster recovery using one or more stretched storage devices. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 5.

Data processing system 500 is an exemplary representation of one or more of management server A 110, host device(s) 115, storage A 120, management server B 145, host device(s) 150, and storage B 155 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

It will be appreciated that additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented methods 200 and 300 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. As used herein, the term "exemplary" refers to embodiments that serve as simply an example or illustration. The use of exemplary should not be construed as an indication of preferred examples. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:
1. A computer-implemented method, comprising:
   determining that at least a portion of a protected site has become unavailable;

determining that a first logical storage device within underlying storage of a recovery site is a stretched storage device, wherein a stretched storage device presents copies of the same data as the same device, stretched across the protected and recovery sites; and initiating a failover workflow in response to the unavailability of the protected site, wherein the failover workflow includes transmitting an instruction to the underlying storage to isolate the first logical storage device from a corresponding logical storage device within the protected site.

2. The computer-implemented method of claim 1, wherein the instruction to isolate the first logical storage device includes preventing the first logical storage device from receiving a heartbeat signal from a corresponding stretched storage device within the protected site.

3. The computer-implemented method of claim 1, wherein the instruction to isolate the first logical storage device includes preventing the first logical storage device from accepting write commands from a corresponding stretched storage device within the protected site.

4. The computer-implemented method of claim 1, further comprising:

determining that a second logical storage device within underlying storage of a recovery site is a stretched storage device stretched across the protected and recovery sites;

determining all virtual machines that reside on the second logical storage device were successfully shut down or migrated to the recovery site prior to the protected site becoming unavailable; and omitting the second logical storage device from logical storage devices to be isolated from corresponding logical storage devices within the protected site.

5. The computer-implemented method of claim 1, wherein the failover workflow further includes restarting a virtual machine within the recovery site, the virtual machine residing on the first logical storage device and running within the protected site prior to the protected site becoming unavailable.

6. The computer-implemented method of claim 1, further comprising:

determining that a second logical storage device within underlying storage of a recovery site is a stretched storage device stretched across the protected and recovery sites;

determining that a live migration of a virtual machine that resides on the second logical storage device was completed prior to the protected site becoming unavailable, wherein the live migration was performed without interruption to one or more services provided by the virtual machine; and omitting the migrated virtual machine from the failover workflow.

7. The computer-implemented method of claim 1, further comprising:

receiving user designation of a first site as the protected site for the first logical storage device;

determining that the site preference for the first logical storage device is not set to the designated protected site; and generating an alert that the site preference does not coincide with protected site.

8. A non-transitory computer-readable medium storing instructions, which when executed by a processing device, cause the processing device to perform a method comprising:

determining that at least a portion of a protected site has become unavailable;

determining that a first logical storage device within underlying storage of a recovery site is a stretched storage device, wherein a stretched storage device presents copies of the same data as the same device, stretched across the protected and recovery sites; and initiating a failover workflow in response to the unavailability of the protected site, wherein the failover workflow includes transmitting an instruction to the underlying storage to isolate the first logical storage device from a corresponding logical storage device within the protected site.

9. The non-transitory computer-readable medium of claim 8, wherein the instruction to isolate the first logical storage device includes preventing the first logical storage device from receiving a heartbeat signal from a corresponding stretched storage device within the protected site.

10. The non-transitory computer-readable medium of claim 8, wherein the instruction to isolate the first logical storage device includes preventing the first logical storage device from accepting write commands from a corresponding stretched storage device within the protected site.

11. The non-transitory computer-readable medium of claim 8, the method further comprising:

determining that a second logical storage device within underlying storage of a recovery site is a stretched storage device stretched across the protected and recovery sites;

determining all virtual machines that reside on the second logical storage device were successfully shut down or migrated to the recovery site prior to the protected site becoming unavailable; and omitting the second logical storage device from logical storage devices to be isolated from corresponding logical storage devices within the protected site.

12. The non-transitory computer-readable medium of claim 8, wherein the failover workflow further includes restarting a virtual machine within the recovery site, the virtual machine residing on the first logical storage device and running within the protected site prior to the protected site becoming unavailable.

13. The non-transitory computer-readable medium of claim 8, the method further comprising:

determining that a second logical storage device within underlying storage of a recovery site is a stretched storage device stretched across the protected and recovery sites;

determining that a live migration of a virtual machine that resides on the second logical storage device was completed prior to the protected site becoming unavailable, wherein the live migration was performed without interruption to one or more services provided by the virtual machine; and omitting the migrated virtual machine from the failover workflow.

14. The non-transitory computer-readable medium of claim 8, the method further comprising:

receiving user designation of a first site as the protected site for the first logical storage device;

determining that the site preference for the first logical storage device is not set to the designated protected site; and generating an alert that the site preference does not coincide with protected site.

15. An apparatus comprising:

a processing device; and a memory coupled to the processing device, the memory storing instructions which, when executed by the processing device, cause the apparatus to:

determine that at least a portion of a protected site has become unavailable;

determine that a first logical storage device within underlying storage of a recovery site is a stretched storage device, wherein a stretched storage device presents copies of the same data as the same device, stretched across the protected and recovery sites; and initiate a failover workflow in response to the unavailability of the protected site, wherein the failover workflow includes transmitting an instruction to the underlying storage to isolate the first logical storage device from a corresponding logical storage device within the protected site.

16. The apparatus of claim 15, wherein the instruction to isolate the first logical storage device includes preventing the first logical storage device from receiving a heartbeat signal from a corresponding stretched storage device within the protected site.

17. The apparatus of claim 15, wherein the instruction to isolate the first logical storage device includes preventing the first logical storage device from accepting write commands from a corresponding stretched storage device within the protected site.

18. The apparatus of claim 15, wherein the instructions further cause the apparatus to:

determine that a second logical storage device within underlying storage of a recovery site is a stretched storage device stretched across the protected and recovery sites;

determine all virtual machines that reside on the second logical storage device were successfully shut down or migrated to the recovery site prior to the protected site becoming unavailable; and omit the second logical storage device from logical storage devices to be isolated from corresponding logical storage devices within the protected site.

19. The apparatus of claim 15, wherein the failover workflow further includes restarting a virtual machine within the recovery site, the virtual machine residing on the first logical storage device and running within the protected site prior to the protected site becoming unavailable.

20. The apparatus of claim 15, wherein the instructions further cause the apparatus to:

determine that a second logical storage device within underlying storage of a recovery site is a stretched storage device stretched across the protected and recovery sites;

determine that a live migration of a virtual machine that resides on the second logical storage device was completed prior to the protected site becoming unavailable, wherein the live migration was performed without interruption to one or more services provided by the virtual machine; and omit the migrated virtual machine from the failover workflow.

* * * * *